United States Patent Office 2,758,257
Patented Aug. 7, 1956

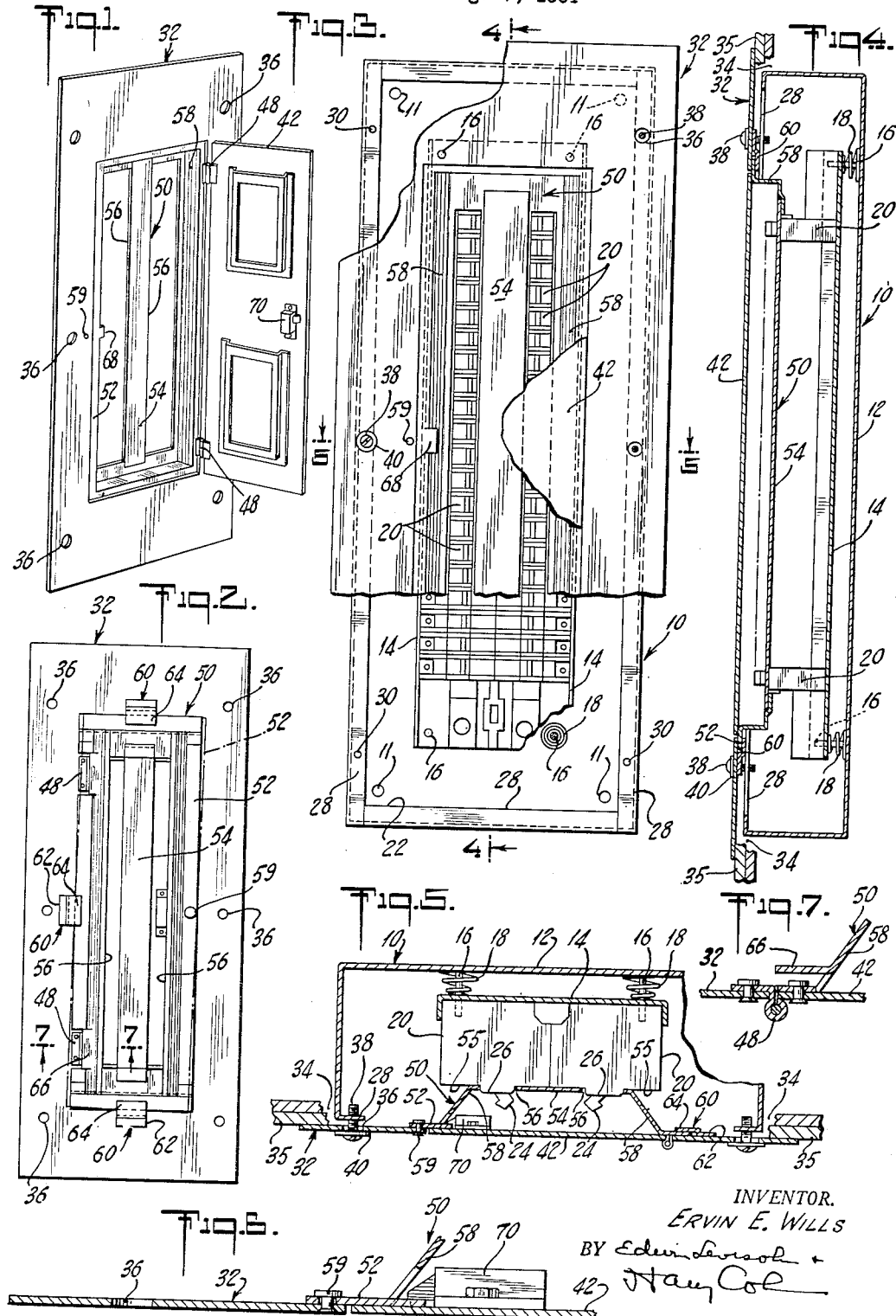

2,758,257

ELECTRIC PANEL ENCLOSURE WITH ADJUSTABLE COVER PLATE

Ervin E. Wills, Affton, Mo., assignor to Federal Electric Products Company, Newark, N. J., a corporation of Delaware Application August 7, 1951, Serial No. 240,661

4 Claims. (Cl. 317—119)

This invention relates generally to wall type installations of cabinets or enclosures for electric panelboards, or the like, and in particular to an adjustable cover plate arrangement thereover.

Panelboard arrangements of the type under consideration generally include a sheet metal box or enclosure containing a back plate or mounting pan adapted to mount and support a panel of circuit protective devices, such as for example, circuit breakers, fuses, switches, starters, etc., or any combination thereof, a door and trim or front plate, and a shield or panel housing which completes the barrier between the panel and the front plate. Where the cabinet is to be flush mounted in a wall, the box or enclosure is ordinarily set in the wall during the course of construction and the front plate is put in place after the finish plaster has been completed. However, for various reasons, the box or enclosure, after the completion of the finish plastering, is frequently found to be out of true, being skewed in a plane parallel with the face of the wall or tilted in a plane which intersects the fact, or both, in addition to which it is usually impossible to predetermine accurately how far back it will be from the finish plaster line. Various expedients are known in the art to provide for an in-and-out adjustment of the mounting pan to expeditiously align the circuit protective devices with the face of the enclosure and the wall surface to provide a "plaster adjustment." Mechanisms to accomplish such an adjustment are disclosed in the copending applications of Paul M. Christensen, Serial No. 131,956, filed December 9, 1949, now Patent No. 2,599,695, and Serial No. 236,441, filed July 12, 1951, now Patent No. 2,681,966, both of which are assigned to the assignee hereof. However, said adjustments do not compensate for the skewing of the box or enclosure. Consequently, the trim has often to be applied to the wall surface in a similar skew which is undesirable. The trim cannot be placed true without regard to the disposition of the box because of the requirement for a shield which shall form an inner cover when the door is open, preventing access to wiring and connections and exposing only the necessarily accessible portions of the protective devices, such as the handles of circuit breakers or switches. Accordingly, this shield must fit the electrical devices and must come up to the trim and around the door opening in the trim so as to form a shallow outer enclosure behind the door.

Therefore, it is an object of the present invention to provide trim members having provision to insure an accurate relation between the circuit protective devices, the shield and the front of the cabinet.

A further object is the provision of a shield which is adjustable laterally relative to the enclosure to compensate for the skewing of the latter so as to expose only the necessarily accessible portions of the panel of circuit protective devices.

Another object is the provision of a trim member or cover plate which is adjustable laterally relative to the enclosure for trueing said cover plate.

The above and other objects, features and advantages of the present invention will be more fully understood from the following description considered in connection with the accompanying illustrative drawings.

In the drawings:

Fig. 1 is a perspective view of a front cover or trim member, pursuant to the present invention, the door thereof being shown in open position;

Fig. 2 is a rear view;

Fig. 3 is a front view on a larger scale, showing the front cover in position on the enclosure, portions being broken away for purposes of illustration;

Fig. 4 is a sectional view taken on the line 4—4 of Fig. 3;

Fig. 5 is a sectional view, on a larger scale, taken on the line 5—5 of Fig. 3;

Fig. 6 is a view similar to Fig. 5 showing a portion thereof on an enlarged scale; and Fig. 7 is a sectional view, on an enlarged scale, taken on the line 7—7 of Fig. 2.

Referring now to the drawings in detail, there is shown a box or enclosure 10 of any suitable type and provided as usual with knockouts or other means for the introductions of the electrical conductors, and with mounting apertures 11, said box being preferably formed of sheet metal. As here shown, the rear wall 12 thereof is provided with means to adjustably mount a mounting pan or back plate 14. More specifically, the back plate is provided with four posts 166 which are received in apertures provided at the four corners of the mounting pan, conical helical spring members 18 being disposed on said posts between the confronting surfaces of the pan and the back wall for biasing the pan toward the front of the enclosure. It will be understood that the foregoing adjustable mounting for the pan 14 does not, per se, constitute part of the present invention and that any suitable means may be used for adjustably mounting the pan 14, such as for example, the adjustable mounting means as illustrated and described in both of the previously noted copending applications.

It will be understood that the pan 14 is provided with any suitable means to removably mount thereon a panel of circuit protective devices such as for example, and without limitation, circuit breakers, switches, fuse box, etc. As herein illustrated, the pan is adapted to mount a panel of circuit breakers 20 which are arranged thereon in two rows extending longitudinally of the pan. It will be apparent that the springs 18 will urge the circuit breakers 20 in a direction away from the rear wall 12 and, with no cover or other obstruction at the open face 22 of the box, the handles 24 and adjacent portions 26 of the circuit breakers will normally extend outwardly of said open face of the box.

The box 10 is provided with the peripherally inwardly extending flange 28 at the front thereof, said flange being provided with the tapped apertures 30 for mounting a cover plate or trim member 32 on the box to provide a front closure therefor. In the event that the enclosure 10 is disposed in a skewed position when mounted in a wall recess 34, provision is made for adjusting the front cover, laterally or in its own plane, so that the latter will nevertheless be in true vertical alignment relative to the wall. In this connection, it will be noted that the cover is provided with a plurality of apertures 36 which are of greater diameter than the diameter of the screws 38 which extend therethrough to be threaded into the apertures 30 of the enclosure. Therefore, it will be readily apparent that the cover may be laterally adjusted, in the event that the box is askew, to provide said vertical alignment thereof. Washers 40 are provided on the cover to conceal the enlarged apertures 36 therein, whereby when the cover is secured in position upon an enclosure which may be askew, it will not be readily apparent to an observer that the enclosure is askew.

It will be noted that the cover 32 is provided with a front door 42 which is hinged as at 48 to provide access to the interior of the enclosure. However, in order to provide a safety front for the enclosure to prevent access to wiring and connections therein when the door 42 is open, provision is made, pursuant to the present invention, for a shield or recessed barrier member 50 which is adjustable laterally, in its own plane, relative both to the enclosure 10 and the front cover or open frame trim member 32 and which prevents access to the interior of the enclosure or to the devices carried by the pan 14 except for the necessarily accessible portions of said devices, such as the handles 24 of the circuit breakers 20. More specifically, and as here shown, the shield is preferably formed of sheet metal and is provided with a flange portion 52 which underlies the trim member and extends completely thereabout, and with a portion 54 which is set back or recessed from the plane of the flange portion so as to provide an abutment for engaging the outer faces 55 of the circuit breakers. More specifically, the recessed part 54 is provided with the vertically extending passages 56—56 into which the face portions 26 of the circuit breakers extend to provide the necessary access to the handles 24 which project outwardly from said passages. It will be noted that the portions 52 and 54 of the shield 50 are interconnected by the portions 58 thereof so as to form a shallow outer enclosure at the front of the enclosure 10 which is covered by the door 42 in the trim member so that when the latter is open all access to the interior of the enclosure 10 is prevented except through the passages 56 in the shield. It will be understood in this connection that the passages 56 in the shield are exactly dimensioned to receive only the portions 26 of the circuit breakers so that there are no spaces or gaps between the shield and the circuit breakers. However, it will be apparent that due to said precise dimensioning of the passages and the complementary parts of the circuit breakers, unless the shield passages are properly aligned with the circuit breaker portions 26, there will be gaps and spaces between the shield and the circuit breakers. This condition will exist unless the trim member is properly and correctly aligned relative to the enclosure 10. Where the enclosure 10 is askew, and the trim member, however, is in correct vertical alignment relative to the wall 35, as previously described, it will be apparent that the passages 56 will ordinarily not be aligned with the circuit breaker portions 26.

It is a highly desirable feature of the present invention to provide for the alignment of the shield relative to the electric devices carried in the enclosure 10 regardless of the relative dispositions of the trim member 32 and the enclosure 10. This is accomplished by providing for the lateral adjustment of the shield, in its own plane, relative to the trim member and to the enclosure 10. Pursuant to the present invention, the shield is pivotally mounted on the inner surface of the trim member 32 as by the rivet pivot stud 59 which interengages the trim member 32 and the underlying flange 52 of the shield. In order to guide the shield in said pivotal movement thereof, the trim member 32 is provided with the guide members 60 secured to the inner surface thereof as at 62 and having the laterally offset portions 64, the flange 52 being disposed between said offset portions 64 and the adjacent surface portions of the trim member. As here shown, three guide members 60 are provided. However, it will be understood that any lesser or greater number may be provided as required. In order to accommodate the hinges 48 on the rear surface of the trim member 32, the shield is provided with the portions 66 struck out from the flange thereof, as illustrated in Fig. 7. It will be noted that the shield is provided also with a struck out portion 68 adjacent the pivot 59 thereof to cooperate with a lock 70 provided on the inner surface of the cover 42, as illustrated in Fig. 6. Since said portion 68 is adjacent the pivot 59, it is substantially in the same position relative to the lock 70 regardless of the pivoted position of the shield 50, whereby it is always available for engagement by the lock. A pivoted position of the shield is illustrated in broken line in Fig. 2. Therefore, it will be apparent that even though the enclosure 10 may be askew so that the rows of circuit breakers are also askew, the shield 50 will nevertheless be properly positionable so that the circuit breaker portions 26 engage in the passages 56 to prevent access into the interior of enclosure 10 when the door 42 is open except to the handles 24 of the circuit breakers.

According to the usual practice, the box or enclosure 10 is first secured in the wall in any suitable manner and connected to the cable or conductor system. After the plaster 35 has been completed, the pan 14 may then be mounted on the supporting posts 16 and the springs 18, the circuit breakers being mounted on the pan either before or after it is positioned in the box. The circuit breakers may then be wired in the usual way and tested before applying the trim member 32 and the shield 50. The shield 50 is applied over the handles 24 and the screws 38 are inserted and tightened until the trim member is drawn snugly against the wall plaster 35. As the trim member is drawn against the wall, the pan 14 is pushed inwardly against the springs 18 which serve to resiliently urge the circuit breakers into abutment with the shield 50. In the event that the circuit breaker portions 26 are not properly disposed in the passageways 56, the shield may be pivoted to eliminate all spaces and gaps between said portions 26 and the shield, the springs 18 serving to seal said portions in the passageways. Before the screws 38 are tightened in the apertures 30, the trim member 32 may be adjusted laterally to provide for the desired vertical alignment thereof. It will be noted that said lateral adjustment of the trim member will not affect the engagement of the circuit breaker parts 26 in the passageways 56 in view of the pivotal relationship between the shield and the trim member 32.

While I have illustrated and described the shield 50 as being pivotally secured to the inner surface of the trim member 32, it will be understood that the shield may be pivotally mounted relative to the pan 14 for proper engagement with the circuit breaker parts 26 without requiring it to be mounted upon the trim member. It will also be understood that any greater or lesser number of passageways may be provided in the shield, than as here shown, in order to accommodate a greater or lesser number of rows of circuit protective devices.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. An electric panelboard construction comprising a box provided with a front opening, electric device mounting means mounted within said box, a front closure for said box comprising an open frame trim member overlying the front of said box and a barrier member provided on said trim member at the opening of said trim member and disposed at a predetermined barrier level within said box, said mounting device being biased toward said front opening to position the electric devices at said barrier level for engagement by said barrier member, means for securing said trim member to said box for adjustment relative to said box, and said barrier member having an adjustable mounting relative to said trim member, whereby said barrier member remains in engagement with the electric devices while the trim member is adjusted on said box.

2. An electric panelboard construction as defined in claim 1, further characterized in that the barrier member is pivotally mounted on the trim member.

3. An electric panelboard construction comprising a box provided with a front opening, electric device mounting means mounted within said box, a front closure for said box comprising an open frame trim member overlying the front of said box and a barrier member provided on said trim member at the opening of said trim member and disposed at a predetermined barrier level within said box, said mounting device being biased toward said front opening to position the electric devices at said barrier level for engagement by said barrier member, said trim member being secured to said box by securing elements which extend through enlarged openings in said trim member to permit for the adjustment of said trim member relative to said box, and said barrier member having a pivotal connection with said trim member, whereby said barrier member remains in engagement with the electric devices while the trim member is adjusted on said box.

4. An electric panelboard construction comprising a box provided with a front opening, an electric device mounted within said box, said device having a portion projecting therefrom toward said front opening, a front closure for said box comprising an open frame trim member overlying the front of said box and a barrier member provided on said trim member at the opening of said trim member, said barrier member having an apertured portion extending into said box, said projecting portion being received in said apertured portion for access through the front opening of said box, means for securing said trim member to said box for adjustment relative to said box, and said barrier member having an adjustable mounting relative to said trim member, whereby the apertured portion of said barrier member remains engaged with the projecting portion of said electric device received therein while the trim member is adjusted on said box.

References Cited in the file of this patent

UNITED STATES PATENTS

| | | |
|---|---|---|
| 1,360,374 | Cuthbert | Nov. 30, 1920 |
| 1,580,334 | Rohn | Apr. 13, 1926 |
| 1,601,606 | Waller | Sept. 28, 1926 |
| 1,752,322 | Adam | Apr. 1, 1930 |
| 1,930,028 | Adam | Oct. 10, 1933 |
| 2,044,860 | Silverman | June 23, 1936 |
| 2,183,872 | Rowe | Dec. 19, 1939 |
| 2,282,520 | Jackson | May 12, 1942 |